July 17, 1951     M. W. HUMPHREYS     2,560,797
JACK
Filed July 10, 1946
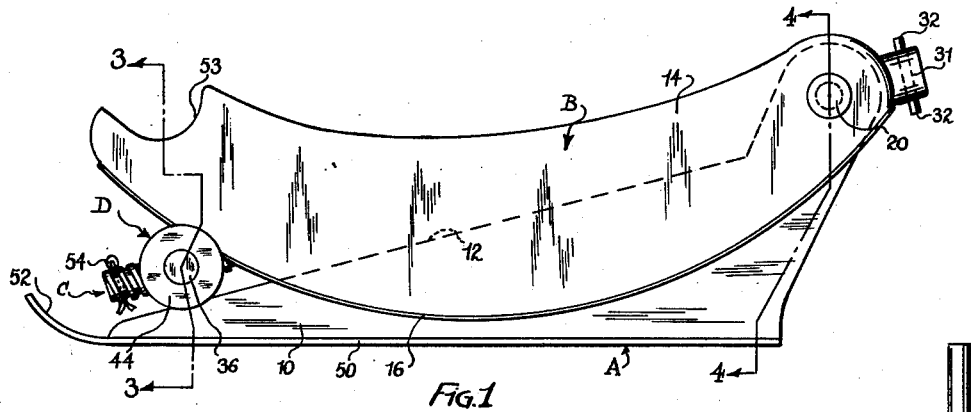
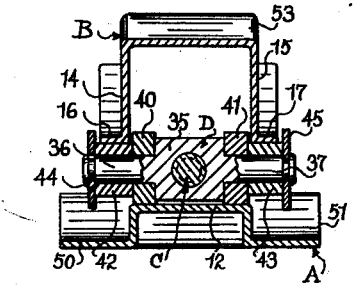
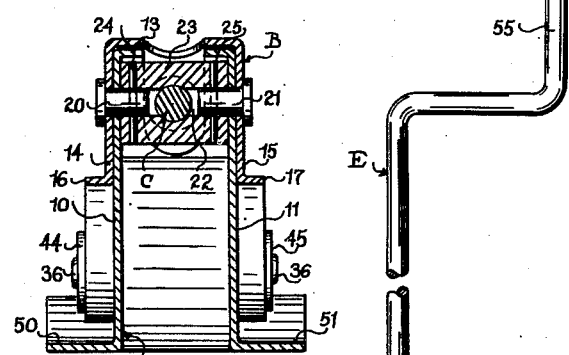
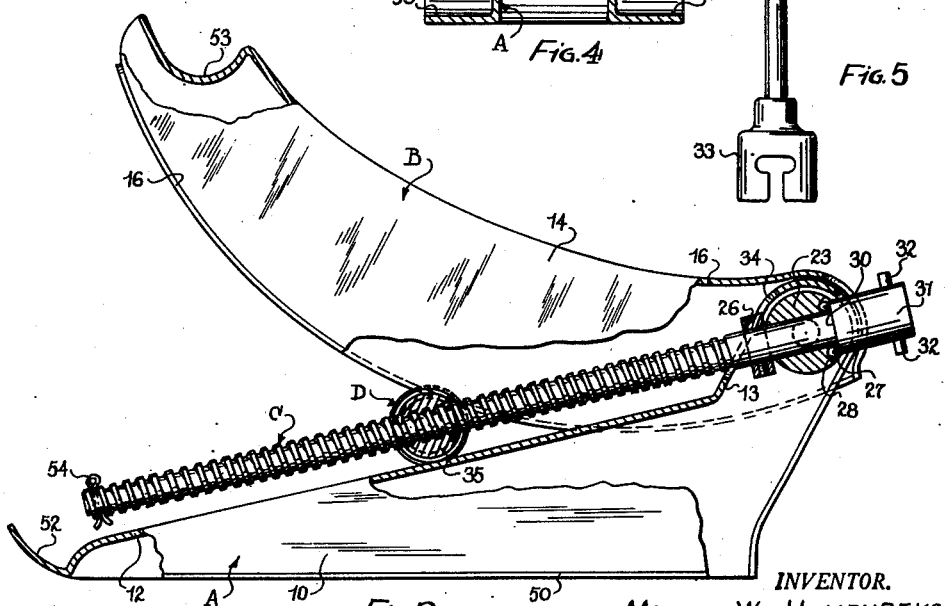
INVENTOR.
MARION W. HUMPHREYS
BY
*Kwis, Hudson, Boughton & Williams*
ATTORNEYS Patented July 17, 1951

2,560,797

UNITED STATES PATENT OFFICE 2,560,797

JACK

Marion W. Humphreys, Euclid, Ohio

Application July 10, 1946, Serial No. 682,561

9 Claims. (Cl. 254—126)

The present invention relates to lifting devices and, more particularly, to an improved automobile jack.

One of the principal objects of the invention is the provision of a new and improved, simple and inexpensive automobile jack comprising an elongated base member adapted to be supported upon the ground or upon some other suitable surface and having an inclined, preferably plane or straight, upper surface or edge, a lifting lever operatively connected to the base member for pivotal movement about a generally horizontal axis adjacent to the higher end of the inclined surface or edge of the base member and above the plane of the surface and having a lower, preferably curved, surface or edge facing oppositely to the inclined upper surface or edge of the base member, and an operating member or assembly in engagement with the oppositely facing surfaces or edges of the base member and lifting lever and reciprocable therebetween for moving the lifting lever relative to the base member about its pivotal connection therewith, in combination with means including a manually operable handle for reciprocating the operating member or assembly.

Another object of the invention is the provision of a new and improved automobile jack comprising an elongated, inverted channel-shaped, unitary sheet metal base member adapted to be positioned upon the ground or a like supporting surface and increasing in height toward one end to provide an inclined, plane or straight upper surface or edge, and a channel-shaped lifting lever formed of sheet metal having a lower curved surface or edge facing opposite to the plane or straight upper surface or edge of the base member pivotally connected to the base member adjacent to the higher end thereof with its sides or portions thereof in overlapping relationship with the sides of the base member, in combination with an operating member or assembly in engagement with the oppositely facing surfaces or edges of the base member and lifting lever and reciprocable therebetween to pivot the lifting lever relative to the base member, and means for reciprocating the operating member.

The invention resides in certain constructions and combinations and arrangements of parts and further objects and advantages will be apparent to those skilled in the art to which it relates from the following description of the preferred embodiment described with reference to the accompanying drawings forming a part of this specification, and in which Fig. 1 is a side view of an automobile jack embodying the present invention;

Fig. 2 is a view similar to Fig. 1 but with the jack in a raised position and with portions broken away to show the operating mechanism;

Fig. 3 is a sectional view approximately on the line 3—3 of Fig. 1;

Fig. 4 is a sectional view approximately on the line 4—4 of Fig. 1; and

Fig. 5 is an elevational view of the operating handle.

Referring to the drawings, the automobile jack shown therein comprises an elongated, unitary, sheet metal base member A adapted to be placed upon the ground or some other suitable supporting surface. The base member is of inverted, channel shape and comprises vertical sides 10, 11 connected at the upper edge by a web. Throughout the greater portion of the length of the base member, the side walls 10, 11 increase in height at a uniform rate toward the rear or right-hand end of the base member, as viewed in Figs. 1 and 2 of the drawings, such that the part 12 of the web adjacent thereto provides an inclined, upper plane surface or straight edge on the base member. The rear ends of the sides 10, 11 raise abruptly adjacent to the rear end of the portions of uniform rise in height as does the web portion 13 adjacent thereto to form an upstanding part on the base member A adjacent to the higher end of the plane surface or straight edge.

The base member A forms a support for an elongated, inverted, channel-shaped, unitary, sheet metal lifting lever B more or less crescent-shaped in side elevation and comprising vertical sides 14, 15 connected by a web 16. Throughout the greater portion of their length, the lower edges of the sides 14, 15 are provided with outwardly projecting flanges 16, 17 providing lower curved surfaces on the lifting lever B facing opposite to the inclined upper surface or edge of the base member A. The lifting lever B is pivotally connected to the upstanding portion of the base member A adjacent to the rear end thereof for rotation about a horizontal axis located adjacent to the higher end of the inclined surface or edge of the base member A and slightly above the plane thereof by a pair of headed pins 20, 21 extending inwardly from opposite sides of the jack through aligned apertures in the sides 10, 11 and 14, 15 of the base member A and the lifting lever B, respectively. The ends of the headed pins 20, 21 project into opposite ends of a transversely extending aperture 22 in a member 23 pivotally carried thereby and located within the upstanding portion of the base member A. The pins 20, 21 are held in assembled relationship with the member 23 by transversely extending pins 24, 25 fixedly secured within aligned apertures in the pins 20, 21 and the member 23. The construction just referred to is clearly shown in Fig. 4.

The member 23 forms the supporting means for the right-hand end of a lead screw C having threaded engagement with an operating member or assembly D interposed between the previously referred to oppositely facing surfaces or edges of the base member A and lifting lever B and reciprocable therebetween to move the lifting lever B about its pivotal connection with the base member to raise or lower the free end of the lifting lever and any load connected to it. Longitudinal movement of the lead screw C within the member 23 is prevented by a collar 26 detachably fixed to the lead screw adjacent to the left-hand side of the member 23, as viewed in Fig. 2, and an anti-friction bearing comprising a plurality of balls 27 interposed between an annular groove or race 28 in the right-hand side of the member 23 adjacent to the lead screw and a shoulder 30 formed by the right-hand end 31 of the lead screw which is of greater diameter than the aperture in the member 23 through which the lead screw projects.

The lead screw C is adapted to be manually rotated by a crank E of suitable construction adapted to be detachably connected to the lead screw by a pair of transversely extending pins 32 on the right-hand end 31 of the lead screw which forms a part of a bayonet joint, the socket part 33 of which is an integral part of the crank E.

The forward wall of the web portion 13 is provided with an aperture 34 through which the lead screw C projects and the rear end of the web stops short of the right-hand end 31 of the lead screw.

The operating member or assembly D shown comprises a cylindrical member 35 threaded upon the lead screw C and having oppositely extending, cylindrical projections or bearing portions 36, 37 provided with anti-friction rollers 40, 41 and 42, 43 engaging the upper inclined surface of the base member A and the lower curved edges of the lifting lever B formed by the flanges 16, 17. The rollers are held in assembled relationship on the portions 36, 37 of the member 35 by washers 44, 45 detachably fixed to the projecting free ends of the members 36, 37. The rollers 40, 41 and the washers 44, 45 are larger in diameter than the rollers 42, 43 engaged by the flanges 16, 17 on the lifting lever B and form means for guiding the flanges and assisting in keeping the various parts aligned.

In the embodiment shown, the longitudinal axis of the lead screw C is parallel with the upper inclined surface of the base member A along which the operating member or assembly D travels, with the result that the free end of the operating handle or crank E remains at the same height above the ground regardless of the position of the operating assembly D between the oppositely facing surfaces or edges of the base member A and lifting lever B.

For the purpose of increasing the stability of the jack and its bearing area upon the ground or other supporting surface without materially increasing its size and weight, the lower edges of the vertical sides 10, 11 of the base member A are provided with outwardly extending flanges 50, 51 formed integral with the sides and with a forwardly extending, upwardly curved flange 52 which facilitates positioning of the jack underneath the axle of an automobile or part to be raised by preventing the front end from digging in if the ground happens to be loose or soft.

The left-hand or free end of the lifting lever B is provided with a load-receiving recess 53 adapted to be positioned underneath the axle or other part of an automobile to be raised.

Suitable means, such as a cotter pin 54 in a transversely extending aperture in the free end of the lead screw, may be provided for limiting the travel of the operating member D in that direction, thus preventing its accidental removal of the operating member from the lead screw. As shown, the threaded portion of the lead screw terminates a short distance from the collar or thrust member 26 which limits the travel of the operating member in the opposite direction. Preferably, the lead screw C is always parallel to the upper plane surface or straight edge of the base member regardless of the position of the operating member or assembly therealong. The height of the crank E above the ground will depend upon its length and the inclination of the inclined surface or edge of the base member A upon which the operating assembly D travels. By varying the inclination of this surface or edge during manufacture, the height which the handle 55 on the crank E will assume can be varied.

The degree of curvature of the lower curved edges or flanges 16, 17 of the lifting lever B may be as desired, depending upon the rise desired for a given linear movement of the operating member or assembly D. Preferably, the curvature is such that the free end of the lifting lever B will rise at a uniform rate upon uniform movement of the operating member D along the base member. Alternatively, a rapid rate of rise might be desired during initial upward movement of the lifting lever with a slower rate later as the jack picks up the load. The required form of curve or surface necessary to obtain any desired rate of rise may be computed mathematically, graphically, or otherwise.

In operation, the lifting lever B is first lowered by rotating the lead screw C in the appropriate direction. The jack is then slid or otherwise moved along the ground underneath the automobile until the load receiving recess 53 is positioned under some suitable part of the automobile; for example, an axle or spring. The crank is then rotated in the opposite direction, drawing the operating assembly D towards the pivot for the lifting lever B and elevating the load receiving recess 53 into engagement with the part to be raised and subsequently raising the same from the ground.

As the load receiving recess 53 is elevated, it moves in a circular arc and has a component of horizontal movement, the amount of which varies depending on the elevation or inclination of the lifting lever with reference to the horizontal. This movement, however, is so small that it is immaterial. In the embodiment shown, this movement has been minimized to some extent by locating the pivot for the lifiting lever B sufficiently high so that in the normal operation of the jack, the load end of the lifting lever moves from one side to the other of the horizontal plane through the axis of rotation of the lever, with the result that the maximum inclination of the lever for a given lift is reduced and the direction of the horizontal component reverses as the lifting lever passes through said horizontal plane. The pivot for the lifting lever may be located at any desired height other than that shown. Generally, when using the jack to raise an automobile, the hand brake on the transmission is applied and the play in the gears of the differential is enough to allow any required movement of the automobile; if not, the jack may move a slight amount relative to either or both the automobile and the ground. The length of the base member A is sufficient to prevent instability from whatever relative horizontal movements actually are introduced.

From the foregoing disclosure, it will be seen that the present invention provides a simple and compact automobile jack which can be economically manufactured from sheet metal or the like and which is simple and easy to manipulate.

While the preferred embodiment of the invention has been described in considerable detail, the invention is not limited thereto; for example, the base member and lifting lever need not be inverted, channel-shaped and could be constructed other than of sheet metal, the lifting lever could move within the base member, the operating member or assembly could be otherwise constructed and/or moved by pressure fluid instead of a lead screw, etc. It is my intention to herein cover all such modifications as may come within the practice of those skilled in the art to which the invention relates and within the scope of the appended claims.

Having thus described my invention, I claim:

1. In a jack, a base adapted to be positioned on the ground or the like and having an elongated upper surface inclined to the horizontal and including a portion extending above the high end of said surface, a lifting lever, means for pivotally connecting said lifting lever to the base above the high end of said inclined surface, said lever having a lower surface oppositely facing said inclined surface and relatively disposed thereto at an acute angle, an operating member intermediate of, and engaging, said surfaces, and means for moving said operating member relative to said surfaces to raise or lower the said lifting lever.

2. In a jack, a base adapted to be positioned on the ground or the like and having side walls and an elongated upper surface inclined to the horizontal and including a portion extending above the high end of said surface, a channel-shaped lifting lever having its sides in overlapping relationship to the sides of said base, means extending through said overlapping sides above the high end of said inclined surface supporting the lifting lever in pivoted relationship to the base, said lever having a lower surface oppositely facing said inclined surface and relatively disposed thereto at an acute angle, an operating member intermediate and engaging said surfaces, and means for moving said operating member relative to said surfaces to raise or lower the said lifting lever.

3. In a jack, a base adapted to rest upon the ground or the like and having side walls and an elongated inclined upper surface and including an extension above the plane of said surface at the high end, a channel-shaped lifting lever having its sides in overlapping relationship to the sides of said base, a thrust member positioned in said extension, means extending through said overlapping sides and into said thrust member supporting said lever in pivoted relationship to said base on an axis above said inclined surface, said lever having lower edges oppositely facing to said inclined surface and relatively disposed thereto at an acute angle, an operating member intermediate of and engaging said inclined surface and said edges, and a threaded operating shaft journaled against axial movement relative to one of said members and threadedly engaged in the other of said members whereby rotation of said shaft moves the operating member relative to said surfaces and edges and pivots said lever relative to said base.

4. In a jack, a base having an elongated inclined straight upper surface and sides extending above said surface at the high end, a channel-shaped lifting lever having its sides in overlapping relationship to the sides of said base, a thrust member, means extending through said overlapping sides and into said thrust member supporting said lever in pivoted relationship to said base and positioning said thrust member a predetermined distance above the plane of said surface, said lever having curved lower edges oppositely facing said inclined surface and relatively disposed at an acute angle, an operating member intermediate of and engaging said surface and edges, and a threaded operating shaft journaled against axial movement relative to one of said members and threadedly engaged in the other of said members whereby rotation of said shaft moves said operating member relative to said surface and edges and pivots said lifting lever relative to said base, said predetermined distance being one-half the thickness of said operating member whereby said shaft will always remain parallel to said upper surface.

5. In a jack, an inverted channel-shaped base having an inclined upper surface and sides including portions extending above the high end of said surface, a lever channel-shaped in cross section having sides in overlapping relationship to the sides of said base, pivot means extending through the sides of said lever and said base supporting the lever in pivoted relationship to said base on an axis above said inclined surface, said sides of said lever having lower edges disposed at an acute angle with the upper surface of said base, an operating member intermediate and engaging said inclined surface and edges, and means for moving said operating member relative to said inclined surface and edges whereby said lever is raised or lowered relative to said base.

6. In a jack, a base member having sides and an elongated upper surface and including a portion extending above said surface, an operating member on said surface and movable relative thereto, a lever having depending portions in overlapping relationship with said sides and lower edges resting on said operating member, a pivot member extending through the base and said depending portions to support the lever in pivoted relationship to said base on an axis above said upper surface with the upper surface of the base and the lower edges of the lever disposed at an acute angle with respect to each other, and means extending through said axis for moving said operating member relative to said surface and edges whereby said lever is raised or lowered relative to said base.

7. In a jack, a base having an elongated inclined upper surface, a lever of relatively thin sheet metal channel-shaped in cross section having oppositely extending flanges along the outer edges of the channel sides, said lever mounted in pivoted relationship to said base, the lower surfaces of said flanges facing opposite to said inclined surface and relatively disposed thereto at an acute angle, an operating member intermediate and engaging said inclined surface and lower surfaces, and means for moving said operating member relative to said surfaces whereby said lever is raised or lowered relative to said base.

8. In a jack, a base having an elongated upper surface, a channel-shaped lever pivoted relative to said base and having downwardly facing surfaces along the lower edges thereof and disposed at an acute angle relative to said upper surface, an operating member intermediate said surfaces of the base and lever, said operating member having means rotatably mounted thereon engaging said upper surface, other means of a smaller diameter also rotatably mounted on said member engaging said downwardly facing surfaces, and other means of larger diameter than said second mentioned means and spaced from the first mentioned means by the thickness of the second mentioned means forming guide channels for the lower edges of said lever, and means for moving said operating member relative to said base.

9. In a jack, a base formed of relatively thin sheet metal of inverted channel-shape in cross section having an elongated inclined upper surface and horizontal flanges on the lower ends of the sides of said channel forming a relatively wide area for contact with the ground, a lever formed of relatively thin sheet metal of inverted channel shape in cross-section and having its sides adapted to overlap the sides of the base pivoted relative to said base with its lower edges facing in a direction opposite to that in which said inclined surface faces and relatively disposed thereto at an acute angle, an operating member intermediate and engaging said inclined surface and edges, and means for moving said operating member relative to said edges whereby said lever is raised and lowered relative to said base.

MARION W. HUMPHREYS.

REFERENCES CITED

The following references are of record in the file of this patent:

UNITED STATES PATENTS

| Number | Name | Date |
|---|---|---|
| 1,901,915 | Loughridge | Mar. 21, 1933 |
| 1,926,610 | Berglund | Sept. 12, 1933 |

FOREIGN PATENTS

| Number | Country | Date |
|---|---|---|
| 265,730 | Great Britain | Feb. 17, 1927 |
| 407,239 | Great Britain | Mar. 15, 1934 |